Nov. 21, 1933.  C. F. HANSON  1,936,450
DEVICE FOR RECIPROCATING STANCHION OPERATING BARS
Filed July 17, 1930
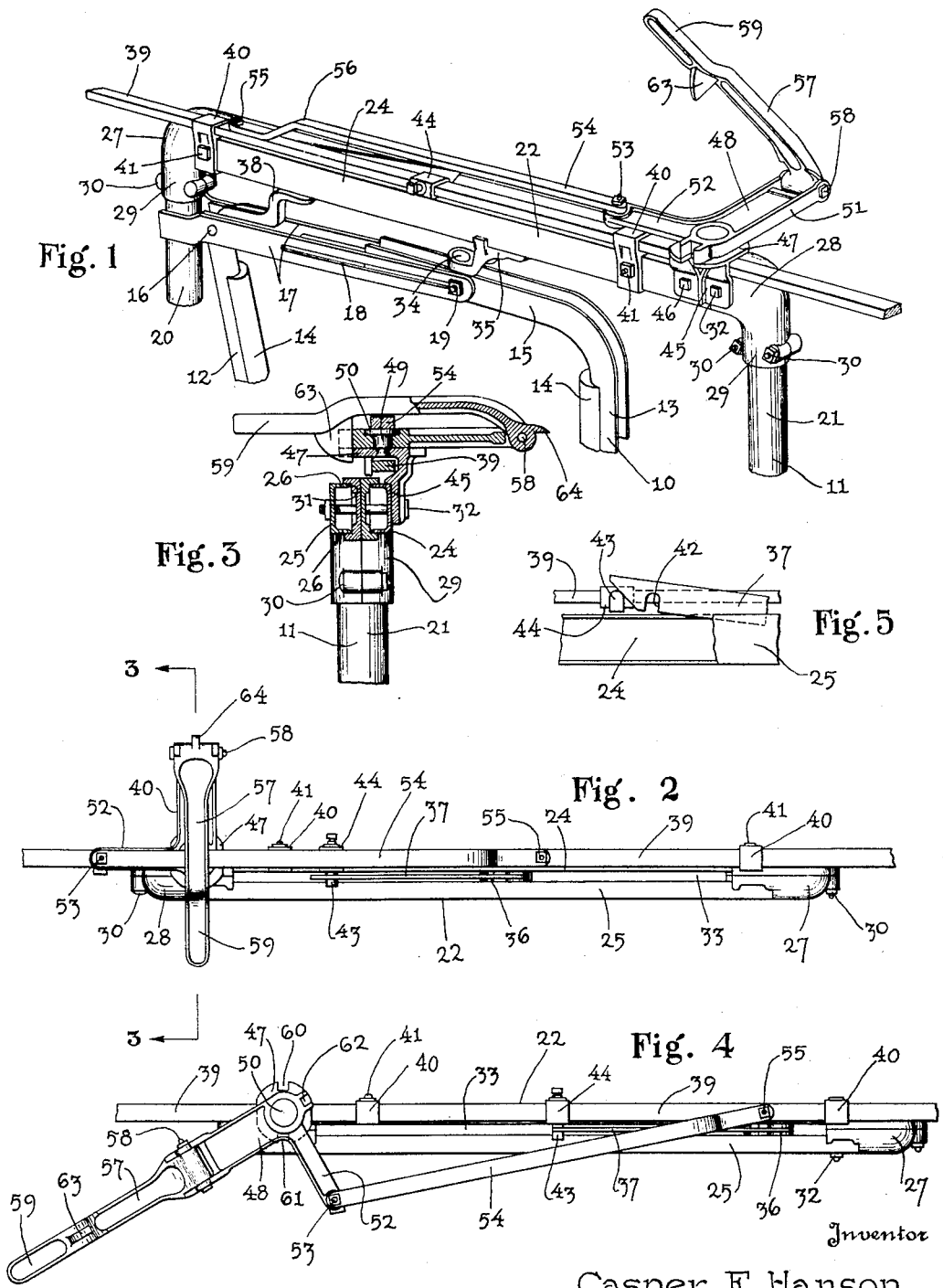
Inventor
Casper F. Hanson
By Canvell & Sagaard
Attorneys Patented Nov. 21, 1933

1,936,450

UNITED STATES PATENT OFFICE 1,936,450

DEVICE FOR RECIPROCATING STANCHION OPERATING BARS

Casper F. Hanson, Albert Lea, Minn., assignor to Olson Manufacturing Company, Albert Lea, Minn., a corporation of Minnesota Application July 17, 1930. Serial No. 468,564

7 Claims. (Cl. 119—148)

My invention relates to devices for reciprocating stanchion operating bars and particularly to devices including a pivoted lever including two arms movable together, one of the arms having a link connected therewith and to the stanchion operating bar and the other having a handle pivoted thereto.

An object of the invention resides in constructing said handle so as to overlie the arm to which it is pivoted in one position and to form a continuation of said arm in another position.

A still further object of the invention resides in constructing said handle with an offset by means of which the same may be caused to overlie the arm to which it is pivoted and to clear the pivot of the arms.

A still further object of the invention resides in providing latching means operable by said handle for latching said arms from movement.

A feature of the invention resides in providing the supporting structure for the arms with a bracket having a bridge overlying the stanchion operating bar and in pivoting said arms to said bridge.

An object of the invention resides in providing a segment having a notch therein fixed with respect to the stanchion support and in providing one of said arms with a notch adapted to register with the notch of the segment and in further providing a latch lug on said handle for simultaneous coaction with said notches to latch the lever from movement with respect to the stanchion support.

Other objects of the invention reside in the novel combination and arrangement of parts and in the details of construction hereinafter illustrated and/or described.

In the drawing:

Fig. 1 is a perspective view of the upper portion of a stanchion and supporting structure therefor illustrating an embodiment of my invention.

Fig. 2 is a plan view of the structure shown in Fig. 1 with the parts in altered position.

Fig. 3 is a cross sectional view taken on line 3—3 of Fig. 2.

Fig. 4 is a view similar to Fig. 2 showing the parts in altered position.

Fig. 5 is a fragmentary elevational view of a portion of the structure shown in Fig. 4.

For the purpose of illustrating the application of my invention, I have shown a portion of a stanchion 10 and a supporting structure 11 therefor. The stanchion 10 comprises side members 12 and 13 constructed of light channel beams and provided with wood facing strips 14. The member 13 is constructed with horizontal upper and lower portions bent outwardly from said member of which the upper portion is indicated at 15. The two members 12 and 13 are pivoted together at the lower portions thereof and the side member 12 has pivoted to the upper end thereof through a rivet 16, two leaves 17 formed with horizontal slots 18 therein. A bolt 19 passes through the slots 18 of the leaves 17 and through the portion 15 of the member 13 so that the side member 12 may be swung into open or closed position in the customary manner, the leaves 17 guiding and limiting the movement thereof.

The supporting structure 11 consists of any suitable stall structure such as is well known in the art and includes two uprights 20 and 21 which are attached to the floor or curb of the barn in any suitable manner. These uprights are preferably constructed of tubular material and are connected together at their upper ends through a header 22. These uprights may be further connected to one another and to the partition members of the stall structure in any suitable manner such as now well known in the art. The particular type of stall construction not forming any feature of this invention has not been shown in the drawing and it can be readily comprehended that any suitable construction may be employed.

The header 22 is constructed from two channel members 24 and 25 which are mounted in spaced relation with the flanges 26 thereof facing one another. This header further comprises two end fittings 27 and 28 which are constructed in halves and formed with portions 29 adapted to fit over the upper ends of the uprights 20 and 21. The halves of these fittings may be bolted together through bolts 30 extending through the same. The fittings 27 and 28 are further constructed at the ends thereof with recessed portions 31 extending toward one another. These portions are of such dimensions as to snugly receive the flanges 26 of the channel members and serve to hold said channel members in proper spaced relation. The two channel members 24 and 25 are secured to the fittings 27 and 28 through bolts 32 which extend jointly through said channel members and the portions 31. By means of this construction the header 22 is formed with a longitudinal groove 33 (Figs. 2 and 4) the purpose of which will be presently described in detail.

The stanchion 10 is supported from the header 22 as follows. The side member 13 of the stanchion is supported from header 22 by means of an attaching member 34 which is held in place between the flanges of the portion 15 of said side member through the bolt 19 previously referred to. This attaching member is pivoted to a bracket 35 which is secured to the lower flanges 26 of the beams 24 and 25 in any suitable manner. The side member 12 of the stanchion is supported by a carriage which I have indicated in its entirety at 36 and which is slidably mounted on the header 22. This carriage has pivotally attached to it a hanger 38 which is directly secured to said side member. In this manner the two side members of the stanchion are independently supported from the header 22. Upon reciprocation of the carriage 36 the hanger 38 together with the side member 12 is moved from open position as shown in Fig. 1 to a closed position in which the axes of the two pivots for the side members 12 and 13 are in substantial alignment with one another. The lower end of the stanchion may be swingably connected to the curb or floor of the barn through a chain or through any other suitable construction which being well known in the art has not been shown in the drawing.

In the illustration of my invention, I have shown but a single stanchion and supporting structure therefor though it is to be understood that the invention is particularly applicable to a plurality of stanchions and stall structures arranged in a row and simultaneously operable as brought out in the patent to Walter 1,350,430.

For the purpose of operating the various stanchions I employ an operating or master bar 39 which is preferably a flat bar of a length equal to substantially the length of the row of stalls. This bar is slidably guided at intervals in guides 40 which are attached through bolts 41 to the various headers 22 at suitable locations thereon. The bar 39 may be slid longitudinally and serves to operate the side member 12 of the stanchion 10, or the corresponding side members of any of the other stanchions which may be connected thereto. Toward this end, an arm 37 is provided pivoted to carriage 36 and having a notch 42 at one end best seen in Fig. 5. This notch is adapted to engage a lug 43 formed on a suitable fitting 44 which may be attached to the bar 39 at the proper location thereon. When the arm 37 is latched to the lug 43 by engagement of said lug with the notch 42, and said arm and the bar 39 moved longitudinally, the side member 12 of the stanchion so connected to said bar is moved in unison with said bar from open to closed position or vice versa as the case may be.

For reciprocating the bar 39 a device is employed which is best illustrated in Fig. 1. This device includes a bracket 45 which is bolted to the fitting 28 or to any other portion of the header 22 through the bolt 32 previously referred to and through another bolt 46. This bracket is disposed to the side of the bar 39 and is formed with a plate like portion 47 in the form of a segment which overlies said bar. To this segment is pivoted a swinging lever indicated in its entirety at 48 which is pivoted on a stud 49 riveted to said segment. The stud 49 is constructed with a head 50 which serves to retain the member 48 in place upon said stud. The axis of the stud 49 is vertical so that the lever 48 swings in a horizontal plane for a purpose to be presently more clearly brought out.

The lever 48 is constructed with an arm 51 which issues radially outwardly from the pivot of said member and with another arm 52 issuing outwardly in angular relation with respect to the arm 51. The arm 52 has pivoted to it through a bolt 53 a link 54 which in turn is pivoted to the bar 39 through another bolt 55 extending jointly through said arm and link. Thus it will become readily apparent that when the lever 48 is oscillated, the bar 39 is reciprocated along the guide 40. In order that the link 54 may clear the fitting 44, said link is constructed with an offset 56 bringing the major portion of said link above the structure of the bar 39.

To reduce the length of the lever 48 when the device is in operative position, a handle 57 is employed which is pivoted to the end of the arm 51 through a horizontally disposed bolt 58. The portion of said arm through which the bolt 58 passes is slightly offset as best shown in Fig. 3 so that said handle may be swung from an extended position as shown in Fig. 4 to an overlying position as shown in Fig. 3. At the end of the handle 57 is formed a hand grasp 59 by means of which the same may be readily manipulated to oscillate the lever 48 and reciprocate the bar 39. In the construction of the device, the arm 52 is preferably disposed at right angles to the arm 51 so that when said arm is in alignment with the bar 39 which is the case when said bar is in either of its extreme positions, the arm 51 and the arm 57 extend transversely across the header 22.

In conjunction with the operating mechanism of the invention I employ a latching device which is best shown in Figs. 1 and 4. The segment 47 on bracket 45 previously referred to is constructed with two notches 60 and 61 at opposite locations in the periphery thereof. A cooperating notch 62 in the portion of the lever 48 above said segment is adapted to register with either of the notches 60 or 61 when the lever 48 is swung into either of its positions shown in Figs. 1 and 2. Upon the under side of the handle 57 is formed a latch lug 63 which is adapted to simultaneously enter the notch 62 of the lever 48 and either of the notches 60 or 61 of the segment 47. When this latch lug is in engagement with the registering notches the same serves to hold the lever 48 from movement and correspondingly locks the bar 39 in position. By means of this construction the bar 39 may be latched in either of its extreme positions to hold the stanchion 10 and any other stanchions connected to the bar 39 in either open or closed position.

The operation of my invention is as follows. In the position shown in Fig. 2, the operating bar 39 is latched so as to hold the stanchions closed. When it is desired to open the same, the handle 57 is swung upwardly on its pivot 58 as shown in Fig. 1 until the same comes into alignment with the arm 51. A stop 64 on said handle engages the under side of the arm 51 and holds the handle 57 in alignment with said arm. By now swinging the lever about the pivot formed by stud 49, through an angle of 180 degrees and until the said lever occupies a position directly opposite to that shown in Fig. 2, the bar 39 is moved to its extreme opposite position in which the stanchion or stanchions connected to said bar are open. If the handle 57 is now folded back upon the arm 51 the lug 63 thereof will engage the notches 62 and 60 to hold the mechanism rigid with the stanchions in open position.

The advantages of my invention are manifest. The operating mechanism may be attached to the operating bar at any position throughout the length thereof and operated in a plane above said bar so as not to interfere with the movement of said bar. The lever may be operated either from the stalls or from the passageway at the heads of the stalls. When the handle is folded into latching position, the same is centrally disposed across the stanchion structure so as to protrude a minimum amount beyond the stanchion structure on either side thereof. When the handle is closed, the stanchions may be latched in either closed or open position as the case may be and the same cannot be unintentionally opened or closed until the handle is manipulated. The device is extremely simple and rugged in construction and is positive in action and easy to operate. The device can be constructed at a reasonable cost and will not readily get out of order.

Changes in the specific form of my invention as herein described may be made within the scope of what is claimed without departing from the spirit of my invention.

Having described my invention what I claim as new and desire to protect by Letters Patent is:

1. In combination with a stanchion, supporting means therefor, a stanchion operating bar connected to said stanchion, guide means for said bar carried by said supporting means, said guide means guiding said bar for reciprocating movement relative thereto, a member pivoted to said supporting means, a link connected to said member and to said bar for reciprocating said bar upon oscillation of said member, a handle movably connected to said member, latching means on said handle, and abutments on said member and said supporting means engaging said latching means to hold said bar immovable.

2. In combination with a stanchion, supporting means therefor, a stanchion operating bar connected to said stanchion, guide means carried by said supporting means, said guide means guiding said bar for reciprocating movement relative thereto, an arm pivoted to said supporting means, another arm projecting outwardly from said first named arm and movable therewith, a link connected to said second named arm and to said bar for reciprocating said bar, and a handle pivoted to said first named arm and adapted to be extended in one position in continuation of said arm for swinging said arm or to be extended in another position along said arm when in one position and latching means operated by said handle and engaging said arms to latch said arms from movement relative to said supporting structure.

3. In combination with a stanchion, supporting means therefor, a stanchion operating bar connected to said stanchion, means carried by said supporting means for guiding said bar for reciprocating movement relative thereto, a notched segment on said supporting means, a member pivoted to said segment and having a portion extending radially outwardly from the pivot thereof, a link connected to said member and to said bar for reciprocating said bar, said member having a notch adapted to register with the notch in said segment, a handle pivoted to the end of the radially extending portion of said member and adapted in one position to lie in continuation of said member for oscillating said member and in another position to overlie said member, and a latch lug on said handle adapted to simultaneously cooperate with the notch in said member and with the notch in said segment when said handle is in its latter position to latch said bar from movement.

4. In combination with a stanchion, supporting means therefor including a substantially horizontal header, a stanchion operating bar connected to the stanchion disposed above said header, means carried by said header for guiding said bar for reciprocable movement along said header, a bracket secured to said header, and overlying said bar, said bracket having a segment thereon provided with a notch, a member pivoted to said segment including an arm extending radially from the pivot thereof, another arm angularly disposed with respect to said first named arm, a link pivoted to said second named arm and bar for reciprocating said bar, a handle pivoted to said first named arm and adapted in one position to lie in continuation of said arm for operating the same, and in another position to lie along said arm, a notch formed in said member and adapted to register with the notch in said segment, and a latch lug on said handle for simultaneously engaging both of said notches when in its latter position to hold said bar from movement.

5. In combination with a stanchion, supporting means therefor including a substantially horizontal header, a stanchion operating bar connected to said stanchion and disposed above said header, means carried by said header for guiding said bar for reciprocating movement along said header, a bracket secured to said header and overlying said bar, said bracket having a segment thereon constructed with a notch, a member pivoted to said segment and having a vertical axis, a link connected to said member and to said bar for reciprocating said bar, said member having a notch adapted to cooperate with the notch in said segment, a handle pivoted to said member along a horizontal axis and adapted to extend outwardly from said member in one position for reciprocating said member and to overlie said member in another position, and a latch lug on said handle for simultaneously engaging said notches when said handle is in its latter position to hold said bar from movement.

6. In combination with a stanchion, supporting means therefor, a stanchion operating bar connected to the stanchion and supported by the support, a member pivoted to said supporting means, and including two arms, a link pivoted to one of said arms and to said bar, a handle pivoted to the other arm and adapted in one position to lie along said arm, said link being adapted in one position to extend across said member, said handle being offset to clear said link.

7. In combination with a stanchion, supporting means therefor including a substantially horizontal header, a single stanchion operating bar connected to the stanchion and disposed above said header, means carried by said header for guiding said bar for reciprocable movement along said header, a bracket secured to said header having parts disposed on each side of said bar and having a bridge portion overlying said bar, a lever for operating said bar, said lever being pivoted to the bridge portion of said bracket and means connecting said lever with said bar.

CASPER F. HANSON.